(12) United States Patent
Scheffler-Hudlet et al.

(10) Patent No.: US 7,435,696 B2
(45) Date of Patent: Oct. 14, 2008

(54) GLASS COMPOSITION WITH HIGH VISIBLE LIGHT TRANSMISSION AND LOW ULTRAVIOLET LIGHT TRANSMISSION

(75) Inventors: Herbert Scheffler-Hudlet, Estado de México (MX); José Guadalupe Cid-Aguilar, Estado de México (MX); Rafael Enrique Pinto-Negroe, Nueva Vallejo (MX)

(73) Assignee: Vidrio Plano De Mexico, S.A. DE C.V., Tlalnepantla (MX)

( * ) Notice: Subject to any disclaimer, the term of this patent is extended or adjusted under 35 U.S.C. 154(b) by 325 days.

(21) Appl. No.: 11/182,449

(22) Filed: Jul. 15, 2005

(65) Prior Publication Data

US 2007/0015654 A1    Jan. 18, 2007

(51) Int. Cl.
C03C 3/087    (2006.01)

(52) U.S. Cl. .............................. 501/70; 501/71; 501/64

(58) Field of Classification Search .................... 501/70, 501/71; 601/64
See application file for complete search history.

(56) References Cited

U.S. PATENT DOCUMENTS

| 5,030,593 | A | 7/1991 | Heithoff | |
|---|---|---|---|---|
| 5,030,594 | A | 7/1991 | Heithoff | |
| 5,346,768 | A | 9/1994 | Winter et al. | |
| 5,656,559 | A | 8/1997 | Combes et al. | |
| 6,218,323 | B1 | 4/2001 | Bretschneider et al. | |
| 6,258,740 | B1 | 7/2001 | Machishita et al. | |
| 6,548,434 | B2 * | 4/2003 | Nagashima | 501/70 |
| 7,169,722 | B2 * | 1/2007 | Landa et al. | 501/71 |
| 2003/0114291 | A1 * | 6/2003 | Koyama et al. | 501/64 |
| 2003/0181309 | A1 * | 9/2003 | Kunert et al. | 501/71 |
| 2005/0233891 | A1 * | 10/2005 | Cid-Aguilar et al. | 501/70 |

OTHER PUBLICATIONS

Hostetter and Roberts, "Note on the Dissociation of Ferric Oxide Dissolved in Glass and its Relation to the Color of Iron-Bearing Glasses," read at the Joint Meeting of the Glass Division of the American Ceramic Society and the English Society of Glass Technology in Pittsburgh, Sep. 2, 1920.

Densem et al., "The Equilibrium between Ferrous and Ferric Oxides in Glasses," communicated to the International Congress on Glass, Sheffield, Jul. 1936, and to the Society at its Glasgow meeting, May 28, 1937.

M.D. Beals, "Effects of Titanium Dioxide in Glass," The Glass Industry, Sep. 1963, pp. 495-501, 530-531.

* cited by examiner

Primary Examiner—Jerry Lorengo
Assistant Examiner—Elizabeth A Bolden
(74) Attorney, Agent, or Firm—Abelman, Frayne & Schwab (57) ABSTRACT

The invention is a glass composition with high visible light transmission and low ultraviolet light transmission, comprising, in weight percentage, less than 0.03 wt % of ferric oxide, from 0.05 to 1 wt % of titanium oxide and from 0 to 0.6 of cerium oxide, the glass having greater than 87% in visible luminous transmittance; a UV light transmission less than 60% and more preferably less than 50%; and, a solar direct transmittance no more than 90%.

7 Claims, 7 Drawing Sheets

GLASS COMPOSITION WITH HIGH VISIBLE LIGHT TRANSMISSION AND LOW ULTRAVIOLET LIGHT TRANSMISSION

BACKGROUND OF THE INVENTION

1. Field of the Invention

This invention refers to a glass composition, and more particularly relates to a glass composition containing less than 0.03 wt % of ferric oxide, from 0.05 to 1 wt % of titanium oxide and from 0 to 0.6 of cerium oxide to produce a glass with a high visible light transmission and low ultraviolet transmission for use in construction, appliance, glazing and automotive industry.

2. Description of the Related Art

The well-known formulations of lime glass, which comprise a mixture of sodium oxide ($Na_2O$), lime (CaO) and silica ($SiO_2$), known also as "soda-lime-silica glass", for the production of "flat glass" for architectural use and, for use in the automotive industry.

For automotive use it is highly desirable that the glass have a high level or percentage of visible light transmission, in order to provide the driver a good visibility of his surroundings, thus complying with the norms of automotive safety. Several patents have been developed for obtaining colorless glass, using a standard glass composition. For construction as well, it is highly desirable that the glass has a high level or percentage of visible light transmission, in order to provide a good vision area.

It is also desirable that the glass has the necessary absorption properties to absorb damaging infrared (IR) and ultraviolet (UV) solar radiation, so as to reduce the excessive heating of the houses or vehicles on sunny days.

Generally, a glass composition contains ferrous and ferric oxides. The balance between ferrous and ferric oxide has a direct effect on the color and transmittance properties of the glass. The iron is generally present in the glass as both ferrous oxide (FeO) and ferric oxide ($Fe_2O_3$) imparting to the glass a clear green-blue color.

In this way, in a glass composition, the total amount of iron is present as both ferric oxide ($Fe_2O_3$) and as ferrous oxide (FeO) since, even when pure ferric oxide is used in the basic raw material during the glass forming process, a portion of the ferric oxide is reduced and is transformed into ferrous oxide.

Normally, the total amount of iron in the glass is expressed as ferric oxide ($Fe_2O_3$) independent of the reduction state of iron. It is also standard in this industry to express the quantity of ferrous or ferric oxide as a percentage of the total iron, namely:

$$\% \ Fe^{+2} (FERROUS) = \frac{FeO \times 100}{Total \ Fe_2O_3}$$

$$\% \ Fe^{+3} (FERRIC) = \frac{Fe_2O_3 \times 100}{Total \ Fe_2O_3}$$

The iron oxides (ferric and ferrous) impart different optical properties to the glass, the total quantity of iron present and its equilibrium as ferric or ferrous have a direct impact on the color, light transmission and absorption of infrared and ultraviolet radiations.

The ferric oxide absorbs ultraviolet energy (low UV transmission), having at the same time higher visible light and of infrared energy transmissions.

By contrast, ferrous oxide absorbs infrared energy (low IR transmission), with a high ultra-violet transmission, and a lower level of visible light transmission, and shifting to a bluer color.

Therefore, the greater the quantity of ferric iron ($Fe^{+3}$) present in the glass, the greater will be the absorption of ultraviolet radiation, and the light transmission increased but, if the content of ferrous iron ($Fe^{+2}$) is increased as a result of the chemical reduction of $Fe_2O_3$, the absorption of the infrared radiation will increase, but the absorption of the ultraviolet radiation is decreased and the light transmission is also (undesirable) decreased.

The greater the concentration of FeO in relation to $Fe_2O_3$, results in a change in the color of the glass. The shift toward a higher concentration of FeO in relation to the $Fe_2O_3$ causes a change of color of the glass from a yellow to yellow-green to a darker blue-green undesirable, because it reduces the light transmission of the glass.

Therefore, to manufacture a glass with determined properties and color, one must have the correct amount of total iron and correct proportion of $Fe_2O_3$ and FeO, taking into account that, what is increased on the ferrous side, will be decreased on the ferric, and consequently one must arrive at a compromise of properties, since improving the value of one of them will deteriorate the value of other properties.

Depending on the state of reduction of the glass, the coloring changes as follows:

Yellow—Low Ferrous (12%)—High Light Transmission (High Ferric)
Yellow-Green
Green-Yellow
Green (Desirable)
Green-Blue
Blue-Green
Blue
Amber—High Ferrous (75%)—Low Light Transmission (Low Ferric)

Additionally, it is known that the oxides of titanium, molybdenum and cerium, principally of cerium, are also colorants, and when they are used in combination with the $Fe_2O_3$, it is possible to obtain an additional reduction of the ultraviolet transmission to a point where the required visible transmission is achieved. In addition, the oxidizing power of cerium changes the state of oxidation of iron oxide from ferrous to ferric conferring to the glass a colorless appearance.

On the other hand, the effects produced by the use of titanium dioxide included the comments that $TiO_2$ greatly increases the refractive index, increases the absorption of radiation in the ultraviolet region, and that also lower the viscosity and surface tension. From the data on the use of titanium dioxide in enamels, they noted that TiO2 increases the chemical durability and acts as a flux. In general, clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties in uses of glasses containing titanium dioxide than on their constitution alone.

Many patents have been issued on colored glass compositions with infrared and ultraviolet radiation absorbing characteristics. The U.S. Pat. No. 5,030,593 issued to Robert Heithoff on Jul. 9, 1991, describes a clear glass, with the substantial absence of color in transmittance, and with an attractive, bright, edge coloration compatible with wood tone surroundings is achieved in a glass having greater than 85 percent, preferably greater than 87 percent, luminous transmittance by minimizing the amount of iron oxide present in the glass and including very small amounts of selenium and (optionally) cobalt oxide. Various warm, wood tone compatible colors at the edge can be attained, including a "honey" color and almost neutral grays.

The U.S. Pat. No. 5,030,594 issued to Robert Heithoff on Jul. 9, 1991, is related to a clear glass, with the substantial absence of color in transmittance, and with an attractive, bright, pure azure edge coloration is achieved in a glass having greater than 87 percent, preferably greater than 90 percent, luminous transmittance by using very small amounts of iron oxide as the sole essential colorant, with the ratio of iron in the ferrous state to total iron being at least 0.4.

The U.S. Pat. No. 5,346,768 issued to Ernst Winter et al, on Sep. 13, 1994, describes a soda-lime glass containing vanadium, in particular a flat glass produced by the float glass process with high UV absorption for wavelengths below 350 nm. The purpose of the invention is to provide a simply and cost effectively producible flat glass, in particular a glass produced by the float glass process with high UV absorption without reduction of the neutrality of color or significant reduction of the total light transmittance (as defined in DIN 1249, Part 10).

U.S. Pat. No. 5,656,559 issued to Jean-Marie Combes et al on Aug. 17, 1997, is related a soda-lime-silica glass composition which enables panes to be produced that have a lower coloration than that of the known glasses and a better absorption of the infrared radiation, even with the same iron content in the form of FeO and the same thickness.

The U.S. Pat. No. 6,218,323 issued Joachin Bretschneider and Hubert Drexler on Apr. 17, 2001, describes a neutral-colored soda-lime-silicate glass with high light transmission in the visible region. The glass has a basic composition which contains at least the following constituents: $SiO_2$, 66-75 weight %; $Na_2O$, 10-20 weight %; CaO, 5-15 weight %; MgO, 0-6 weight %; $Al_2O_3$, 0-5 weight %; and $K_2O$, 0-5 weight %; and incorporates a colorant portion comprising the following constituents: Co, 0.1-1 ppm; $Fe_2O_3$, .Itoreq.0.03 weight % (total iron content); and $FeO/Fe_2O_3$, <0.4. The glass possesses a light transmittance (illuminant D 65 according to DIN 67 507) of at least 89% at a reference thickness of 4 mm.

Finally, the U.S. Pat. No. 6,258,740 issued to Hiroshi Machishita; et al, on Jul. 10, 2001, describes an ultraviolet ray absorbing soda-lime glass. This glass contains less than 0.10 wt % of iron in terms of $Fe_2O_3$, which is optionally contained as an impurity in the glass, 0.7-2.6 wt % of $CeO_2$, 0-1.3 wt % of $TiO_2$, 0-0.12 wt % of $V_2O_5$, 0.08-0.30 wt % of sulfur in terms of $SO_3$, and 0-0.0025 wt % of CoO. The glass at a thickness of 5 mm is not higher than 10% in ultraviolet radiation transmittance, is not lower than 80% in visible light transmittance, and is from 530 to 575 nm in dominant wavelength. The glass is transparent and clear, superior in ultraviolet ray absorption capability, and not as high in visible light transmittance On the above, many others patents and papers have been published on colored glass compositions with infrared and ultraviolet radiation absorbing characteristics, to describe the importance of the equilibrium between ferrous and ferric oxides in glasses. For example "N. E. Densem; The equilibrium between ferrous and ferric oxides in glasses; Journal of the Society of Glass Technology, Glasgow, England, May 1937, pp. 374-389"; "J. C. Hostetter and H. S. Roberts, "Note on the dissociation of Ferric Oxide dissolved in glass and its relation to the color of iron-bearing glasses; Journal of the American Ceramic Society, USA, September, 1921, pp. 927-938".

However as it can be clearly appreciated from the above patents, in order to express the visible light transmission characteristics of a glass, it is necessary to take into account the following three main points:

1. The thickness at which it is measured, since the transmission of UV, visible light and infrared decrease in direct relation with the increase of the thickness of the glass.

2. The wavelengths of the different zones (limits), for example the UV transmission is considered to be from 300 to 400 nm (General Motors); from 300 to the half the value of 400 nm (Ford), since the other half is transferred to the visible light; from 300 to 390 nm (PPG's U.S. Pat. No. 5,240,866); from 280 to 380 nm in ISO9050; as well as if the increments (cell thickness) were from 2.5, 5 or 10 nm each, taking in account also the procedure used for the area integration. Consequently, there will be different values when measuring the ultraviolet transmission for the same product.

3. The Standard utilized in respect to the solar energy, should be established beforehand, for example: "CIE PUBL:" 40; and the air mass, Perry & Moon Air Mass=2, Air Mass=1.0 or air mass 1.5 as recent GMW3136 standard.

According to the present invention, there is provided a soda-lime-silica glass composition that uses ferric oxide, titanium oxide and cerium oxide to produce a colorless glass with a high visible light transmission for use in the construction, appliances, glazing and automotive industry with a thickness of about 2 to 20 mm and preferably about 3.2 mm.

Papers have been written on the behavior of the Titanium $TiO_2$ in the transmission of colorless glasses. i.e. Striple, J. H. "Titanium dioxide its effect on the transmission of various glasses", The glass industry/April 1964, pp 193-196. The author comments that the $TiO_2$ optically changes the light transmission to a major wavelength, extending the transmission range in the infrared and absorbing more in the ultraviolet.

The more stable form of Titanium in the glass is the tetravalent ($Ti^{4+}$), which is colorless and, only the trivalent form ($Ti^{3+}$) produces color. However, said color has not be found in soda-lime-silica glasses.

M. D. Beals in the paper, "Effects of Titanium Dioxide in Glass", "The glass industry, September, 1963, pp 495-53, describes the interest that has been shown the titanium dioxide as a constituent of glasses. The effects produced by the use of titanium dioxide included the comments that $TiO_2$ greatly increases the refractive index, increases the absorption of light in the ultraviolet region, and that is lowers the viscosity and surface tension. From the data on the use of titanium dioxide in enamels, they noted that $TiO_2$ increases the chemical durability and acts as a flux. In general, clear glasses containing titanium dioxide may be found in all of the common glass-forming systems (borates, silicates, and phosphates). The various regions of glass formation for systems containing titanium dioxide are not grouped in any one place, since the organization of the discussion is based more on the properties than use of glasses containing titanium dioxide than on their constitution alone.

From the above, the present invention is related to a colorless soda-lime-silica glass composition, which contains less than 0.03 wt % of total iron expressed as ferric, from 0.05 to 1 wt % of titanium oxide and from 0 to 0.6 wt % of cerium oxide. The glass at 3.2 mm is higher than 87% in visible light transmittance (Ilum D65 according ISO 9050) and higher than 89% more preferable.

SUMMARY OF THE INVENTION

It is therefore the main objective of the present invention to provide a glass composition, which can be, manufactured a thickness of about 3.2 millimeters having a high light transmission with a value greater 87, preferably a value greater than 89%.

Similarly is another objective of the present invention is to provide a glass composition, of the previously mentioned nature, and which contains from less than 0.03 wt % of ferric oxide, from 0.05 to 1 wt % of titanium oxide and from 0 to 0.6 wt % of cerium oxide.

In addition, still another main objective of the present invention to provide a glass composition, which reduce the thickness of a glass sheet maintaining its desirable properties of transmission of visible light and of the absorption of solar direct and ultraviolet radiation.

An additional objective of the present invention is to provide a glass composition, wherein the combination of TiO—$CeO_2$, diminish the UV transmission, without affecting the visible region.

These and other objectives and advantages of the glass composition, of the present invention will become evident to persons who have knowledge in the field, from the following detailed description of the invention, in relation to a specific embodiment.

DETAILED DESCRIPTION OF THE INVENTION

The invention will now be described in relation to a specific embodiment, wherein the amounts of the main components which are critical for obtaining a glass composition with the desired properties of visibility transmission and the absorption of solar direct and ultraviolet radiation are set forth.

A typical composition of soda-lime-silica glass used in glazing and automotive industry, and formed by the so-called float glass process, is characterized by the following formulation based on wt. % with regard to the total weight of the glass:

| Components | % by weight |
|---|---|
| $SiO_2$ | 70 to 75 |
| $Na_2O$ | 10 to 15 |
| CaO | 5 to 10 |
| MgO | 0 to 5 |
| $K_2O$ | 0.0 to 3 |
| $Al_2O_3$ | 0.1 to 1.0 |

The glass composition of the present invention is based on the above disclosed composition, and which the following compounds have been added:

| Components | % by weight |
|---|---|
| Low content of $Fe_2O_3$ | <0.03 |
| $TiO_2$ | 0.05 to 1.0 |
| $CeO_2$ | 0 to 0.6 |

When the compounds were added to the basic composition, a glass sheet with a thickness of about 3.2 millimeters was manufactured, resulting with a visible light transmission (TL D65 according to ISO 9050) of at least 87%; a ultraviolet radiation transmittance (TUV according to ISO 9050) less than 60% and more preferably less than 50%; a solar direct transmittance (TE according to ISO 9050) of no more than 90%; a dominant wavelength between 600 ηm and 490 ηm; a purity of less than 2%; and a color tint as defined in the CIE Hunter Lab illuminant C, 2° standard observer, in the ranges ah (green-red) from 0 to –0.5; bh (blue-yellow) from –0.5 to 1.0, and having an Lh value greater than 93.

To obtain these measures, raw materials with a low content of $Fe_2O_3$ were requested, which are different of those used in the commercial glasses. Sands with maximum contents of 0.010% $Fe_2O_3$ and dolomites with about 0.03% $Fe_2O_3$ were used and the limestone was substituted by the calcite about 0.010% $Fe_2O_3$. An example of a batch mixture that can be used to produce glass of the present invention is as follows:

| Batch | Parts by weight |
|---|---|
| Sand | 1000 |
| Soda ash | 327.1 |
| Dolomite | 256.9 |
| Saltcake | 12.3 |
| Calcite | 67.820 |
| Calcined Alumina | 8.0 |

It is common in the glass industry to refer the total iron content in the glass composition or in the glass melting mixture, as the total iron expressed as $Fe_2O_3$.

When glass is melted, part of the amount of total iron is reduced to FeO, while the rest is maintained as $Fe_2O_3$. The balance between the ferric and ferrous oxidation states in the melted mixture are the result of an equilibrium of the final oxidation reduction state, which is a mixture between the use of oxidation or reducing agents in the feed mixture and to the combustion characteristics, for example, the air-gas relationship used in the furnace in order to melt the mixture. The reduction of ferric to ferrous, produces not only FeO, but also oxygen, decreasing the combined weight of the two iron compounds in the resulting glass.

Consequently, the combined weight of the FeO and $Fe_2O_3$ contained in the resulting glass composition will be minor, less than that fed during the mixture and less than the total of the initial iron used expressed as $Fe_2O_3$. For this reason, it is understood that the total iron is the original iron expressed as $Fe_2O_3$, as it is used herein, as meaning the amount of iron fed in the mixture before its reduction. And it is to be understood that the reduction value of the ferrous state is defined as the weight of the ferrous oxide (FeO) expressed as Ferric oxide ($Fe_2O_3$) in the glass product, divided by the weight percentage of total iron expressed as percentage.

The physical properties such as visible light transmission correspond to calculated variables based on internationally accepted standards. So that, the light transmission is evaluated using the illuminant "D65". The wavelength range used for these purposes is from 380 to 780 ηm, integrating values in numeric form with intervals of 10 ηm. The solar direct transmission represents the heat which the glass achieves in direct form, evaluating it from 300 ηm to 2500 ηm with intervals of 50 ηm, the numeric form of calculation uses as recognized standard values those reported by ISO 9050.

The calculation of the ultraviolet radiation transmission (UV), involves only the participation of the solar UV radiation, so that it is evaluated in the range of 280 to 380 ηm of wavelength using intervals of 5 ηm. For the infrared radiation transmission (IR), it is only contemplated, as well as the UV radiation, the range wherein the solar spectrum has influence, so that the range of the near infrared region from 800 to 2500 ηm, with intervals of 50 ηm, is used. Both calculations use the solar radiation values of ISO 9050 standard.

The amount of solar heat which is transmitted through the glass also can be calculated by the contribution of thermal energy with which participates each one of the regions wherein the solar spectrum has influence, which is from the ultraviolet region (300 ηm), to near infrared region (2500 ηm), which is of 3% for UV, 44% for the visible and of 53% for the IR, however, the values of the direct solar energy transmission, in the present invention, are calculated on the basis of a numeric integration taking into account the whole range of the solar spectrum of 300 to 2500 ηm, with intervals of 50 ηm and using the values of solar radiation reported ISO standards.

The specifications for the determination of color such as the dominant wave length and the purity of excitement have been derived from the tristimulus values (X, Y, Z), which have been adopted by the International Commission of Illumination (C.I.E.), as direct result of experiments involving many observers. These specifications could be determined by the calculation of the three-chromatic coefficients X, Y, Z of the tristimulus values that corresponding to the red, green and the blue colors, respectively. The three-chromatic values were graphicated in the chromaticity diagram and compared with the coordinates of the illuminant "C" considered as illumination standard. The comparison provides the information in order to determine the color purity excitement and its dominant wavelength. The dominant wavelength defines the wavelength of the color and its value is located in the visible range, of the 380 to 780 ηm, while for the purity of excitement, the less the value is, the nearest tends to be a neutral color. A deeper understanding of the topics can be obtained from the "Handbook of Colorimetry" published by the "Massachusetts Institute of Technology", of Arthur C. Hardy, issued in 1936.

The color variables Lh, ah y bh of the color system Hunter Lab Color space, illuminant C, 2° standard observer are also calculated through the tristimulus values.

The table I show the results for a first experiment, wherein the compounds considered in this invention were added, all of them combined with a typical composition of soda-lime-silica glass.

TABLE I

Melting glass composition $Fe_2O_3$—$TiO_2$—$CeO_2$

| | Sample | | | | | |
|---|---|---|---|---|---|---|
| | 1 | 2 | 3 | 4 | 5 | 6 |
| Thickness (mm) | 3.11 | 3.19 | 3.16 | 3.18 | 3.19 | 3.15 |
| | | % by weight | | | | |
| Total iron (expressed as Fe2O3) | 0.0125 | 0.0153 | 0.0153 | 0.0153 | 0.0153 | 0.0153 |
| TiO2 | 0.005 | 0.005 | 0.005 | 0.260 | 0.261 | 0.262 |
| % CeO2 | 0.000 | 0.000 | 0.100 | 0.100 | 0.051 | 0.000 |
| FeO (Ferrous expressed as ferric) | 0.001 | 0.002 | 0.001 | 0.001 | 0.001 | 0.002 |
| Fe2O3 (Ferric) | 0.011 | 0.014 | 0.015 | 0.015 | 0.014 | 0.013 |
| % Reduction of Iron to FeO | 11.1 | 10.7 | 5.0 | 4.4 | 7.1 | 15.9 |
| TUV (%) | 80.5 | 79.0 | 48.6 | 47.9 | 54.4 | 79.0 |
| TL (%) | 90.1 | 89.7 | 90.9 | 91.0 | 90.2 | 90.8 |
| TE (%) | 89.4 | 89.0 | 88.8 | 88.7 | 88.3 | 89.6 |
| COLOR TRANSMITTED CIE Hunter Lab illuminant C, 2° standard observer | | | | | | |
| Lh | 94.9 | 94.7 | 95.3 | 95.4 | 95.0 | 95.3 |
| ah | −0.14 | −0.17 | −0.09 | −0.11 | −0.15 | −0.15 |
| bh | 0.16 | 0.18 | 0.29 | 0.33 | 0.38 | 0.22 |
| X | 88.28 | 87.84 | 89.05 | 89.16 | 88.34 | 87.58 |
| Y | 90.1 | 89.7 | 90.9 | 91.0 | 90.2 | 90.8 |
| Z | 106.3 | 105.7 | 106.9 | 107.0 | 106.0 | 102.6 |
| Dominant wevelenghth (nm) | 568.9 | 564.5 | 577.8 | 574.6 | 572.3 | 569.9 |
| Excitation Purity (%) | 0.1 | 0.1 | 0.2 | 0.2 | 0.3 | 0.2 |
| | Sample | | | | | |
| | 7 | 8 | 9 | 10 | 11 | 12 |
| Thickness (mm) | 3.17 | 3.08 | 3.07 | 3.22 | 3.08 | 3.18 |
| | | % by weight | | | | |
| Total iron (expressed as Fe2O3) | 0.0153 | 0.0153 | 0.0236 | 0.0236 | 0.0236 | 0.0237 |
| TiO2 | 0.605 | 0.605 | 0.005 | 0.262 | 0.605 | 0.005 |
| % CeO2 | 0.050 | 0.100 | 0.100 | 0.000 | 0.000 | 0.000 |

TABLE I-continued

| Melting glass composition $Fe_2O_3$—$TiO_2$—$CeO_2$ | | | | | | |
|---|---|---|---|---|---|---|
| FeO (Ferrous expressed as ferric) | 0.001 | 0.001 | 0.001 | 0.004 | 0.005 | 0.003 |
| Fe2O3 (Ferric) | 0.014 | 0.015 | 0.022 | 0.020 | 0.018 | 0.020 |
| % Reduction of Iron to FeO | 7.7 | 4.0 | 6.3 | 15.3 | 22.1 | 13.5 |
| TUV (%) | 54.7 | 46.8 | 48.1 | 74.5 | 75.0 | 75.6 |
| TL (%) | 91.2 | 90.5 | 90.9 | 90.4 | 91.7 | 89.5 |
| TE (%) | 89.1 | 88.3 | 88.5 | 88.8 | 89.4 | 88.3 |
| COLOR TRANSMITTED CIE Hunter Lab illuminant C, 2° standard observer | | | | | | |
| Lh | 95.5 | 95.1 | 95.3 | 95.1 | 95.7 | 94.6 |
| ah | −0.12 | −0.21 | −0.10 | −0.23 | −0.25 | −0.23 |
| bh | 0.40 | 0.42 | 0.39 | 0.25 | 0.27 | 0.19 |
| X | 89.39 | 88.67 | 89.09 | 88.57 | 89.75 | 87.62 |
| Y | 91.2 | 90.5 | 90.9 | 90.4 | 91.7 | 89.5 |
| Z | 107.2 | 106.3 | 106.8 | 106.5 | 107.9 | 105.5 |
| Dominant wevelenghth (nm) | 575.1 | 570.2 | 575.1 | 562.1 | 559.9 | 551.2 |
| Excitation Purity (%) | 0.3 | 0.3 | 0.3 | 0.1 | 0.2 | 0.1 |

Figure 4:
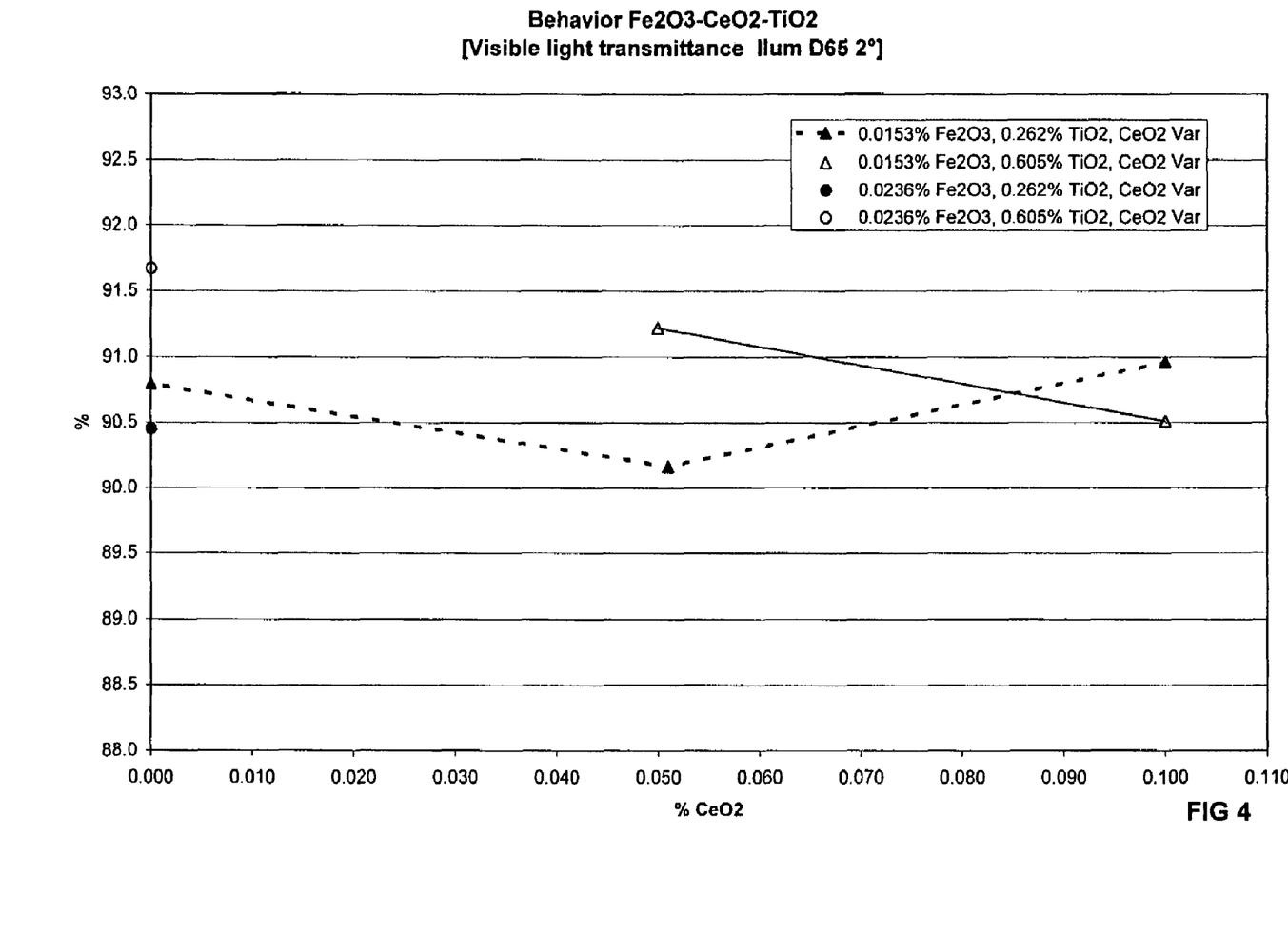
FIGS. 4 through 6 are graphs showing the behavior of $Fe_2O_3$—$CeO_2$—$TiO_2$ against visible light transmittance (TL), solar direct transmittance (TE) and ultraviolet radiation transmittance (TUV), respectively; and, FIG. 7 is a color transmission graph showing the relation between the color tint as defined in the CIE Hunter Lab illuminant C, 2° standard observer, in the ranges ah (green-red) from 0 to –0.300; bh (blue-yellow) from 0.0 to 0.45, for some values showed in the table 1, of the glass composition of the present invention.
Figure 5:
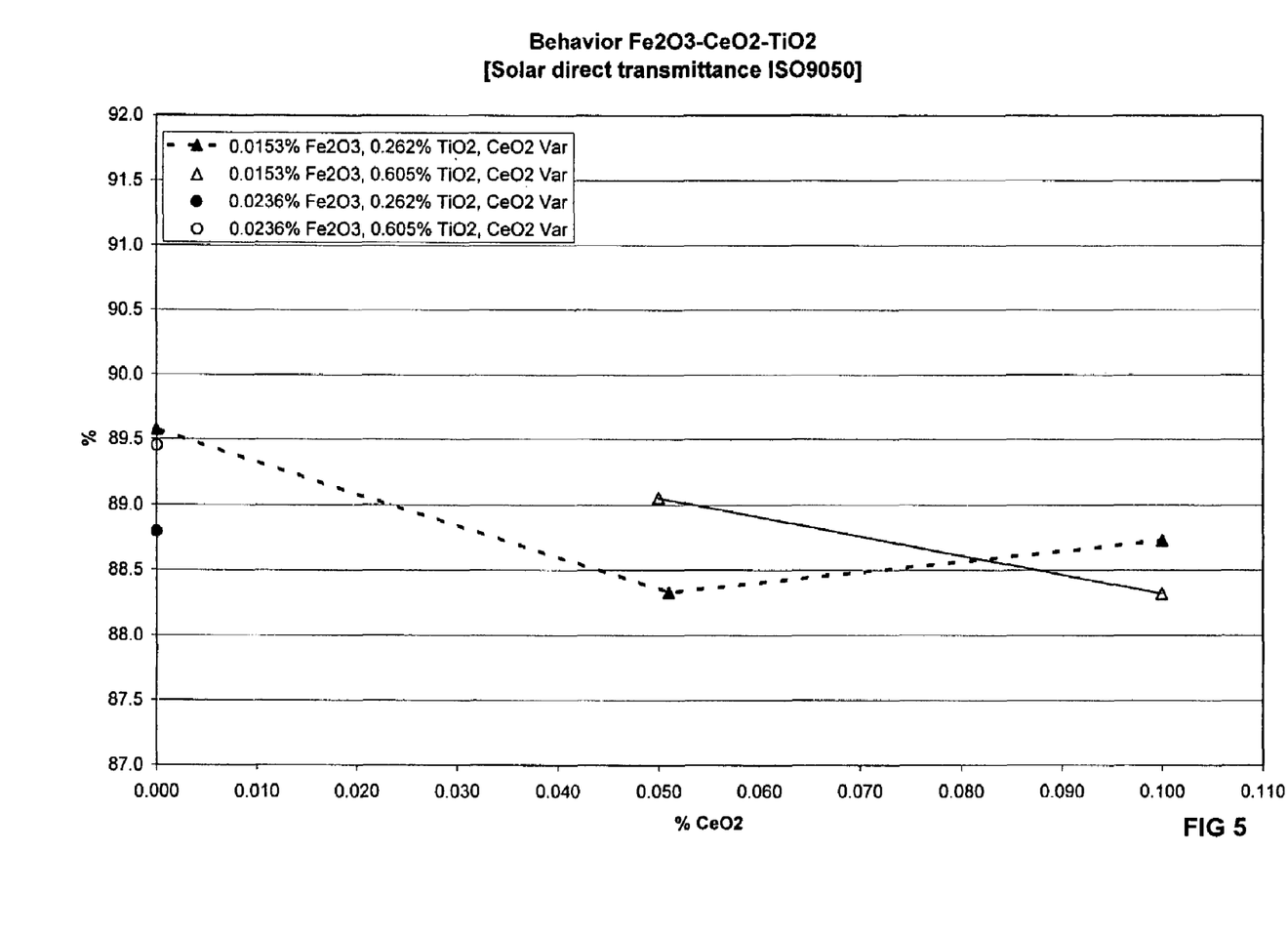
Figure 6:
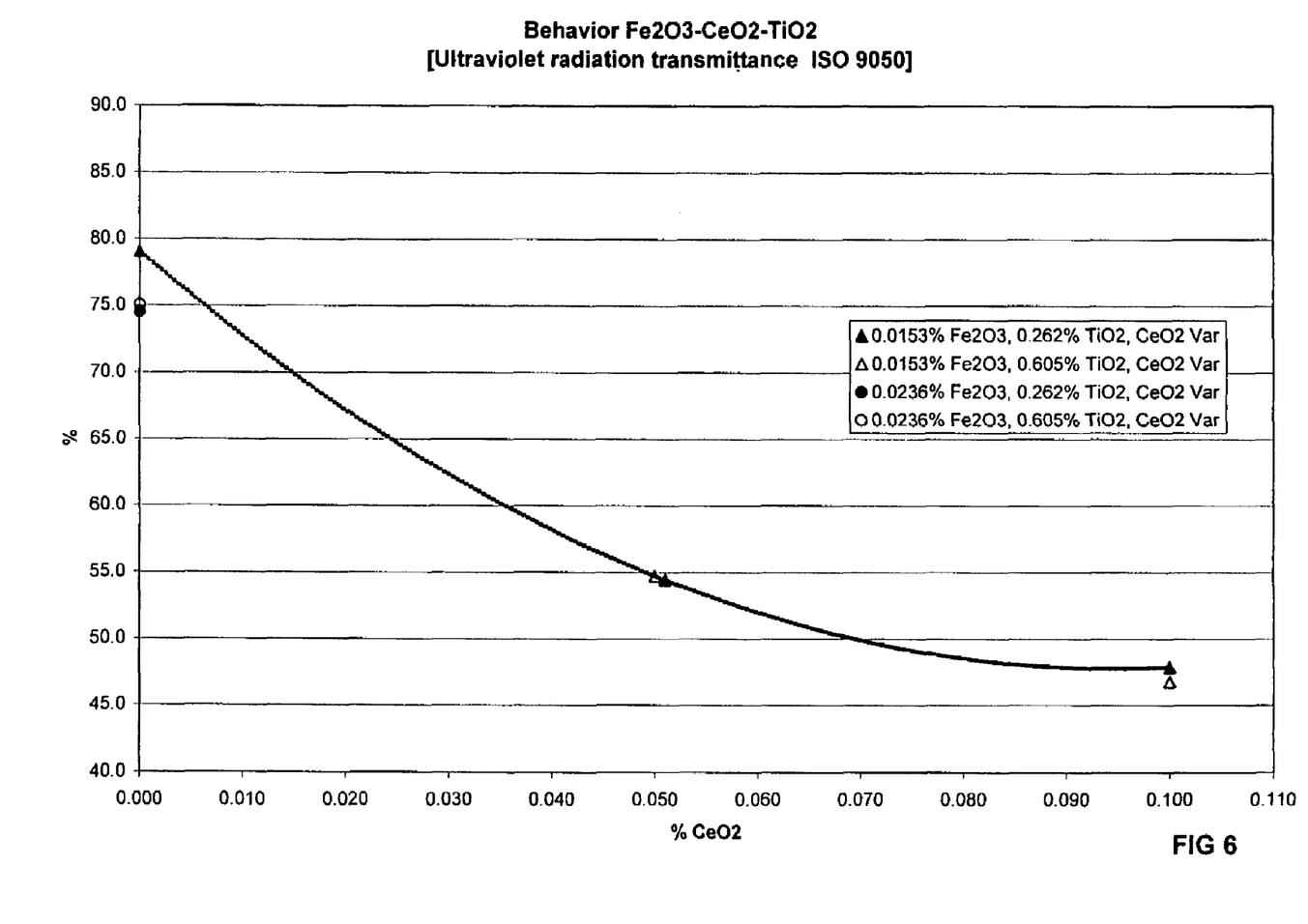
Figure 7:
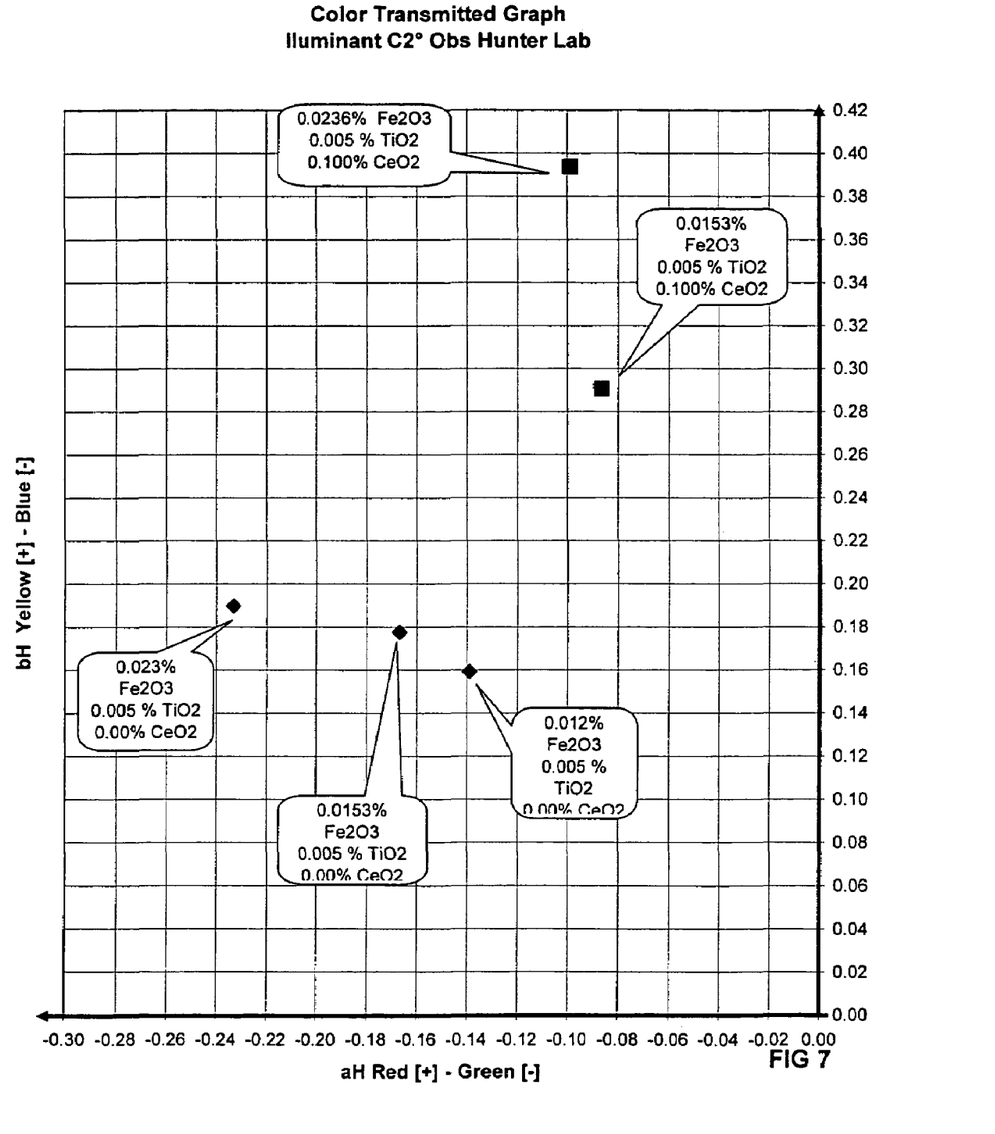

The FIGS. 4-6 were plotted individually considering % $CeO_2$ in sample vs. the % TUV, % TL and % TE, which were obtained of the table 1. The data obtained for the % $TiO_2$ were plotted to show the behavior of the $Fe_2O_3$—$TiO_2$—$CeO_2$.

The previous table I show that when the $TiO_2$ and $CeO_2$ were combined and added to the soda-lime-silica glass composition, the light transmission was increased to a level of $Fe_2O_3$ that is less than 0.03%.

Figure 1:
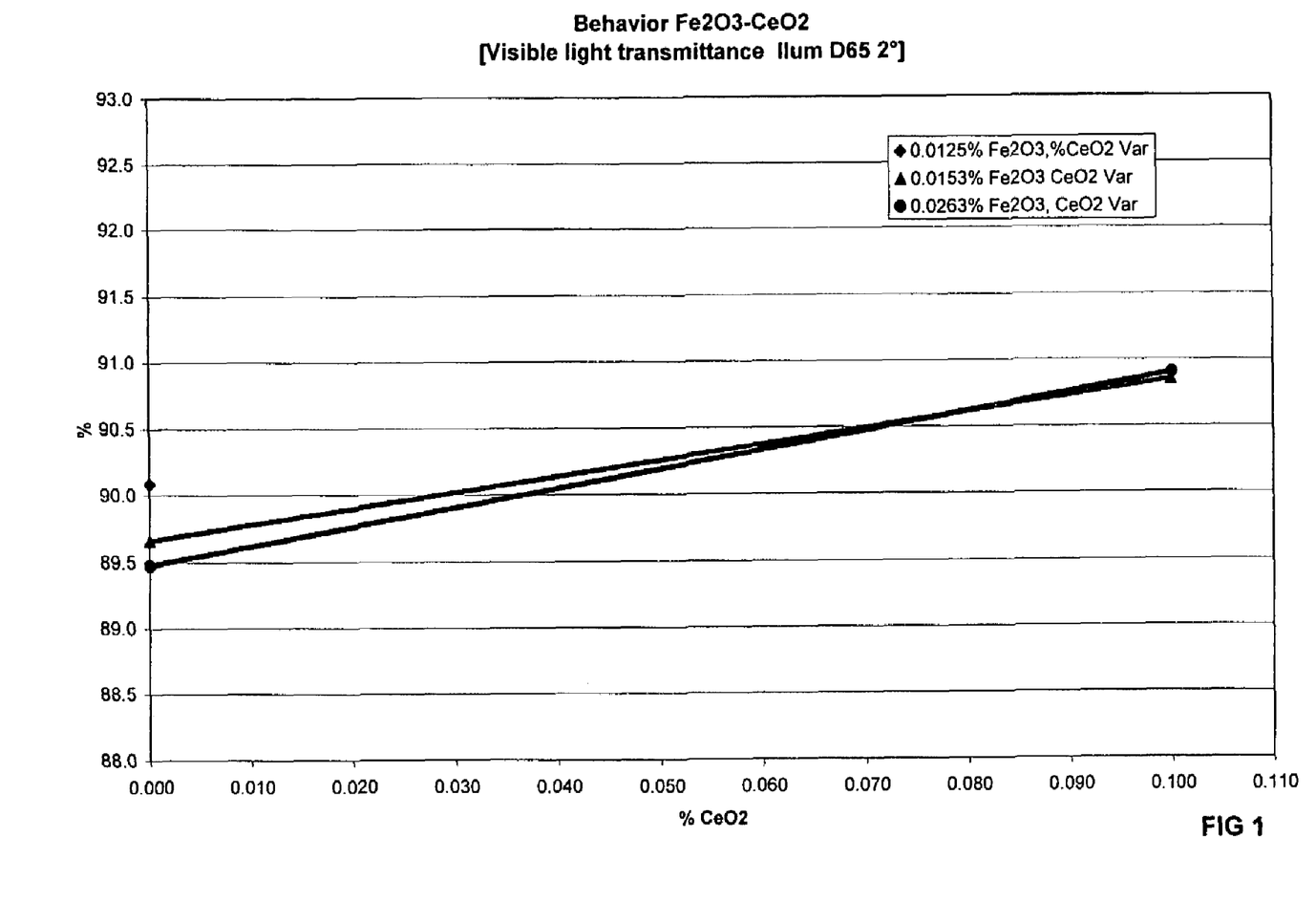
FIGS. 1 through 3 are graphs showing the behavior of $Fe_2O_3$—$CeO_2$ against visible light transmittance (TL), solar direct transmittance (TE) and ultraviolet radiation transmittance (TUV), respectively.
Figure 2:
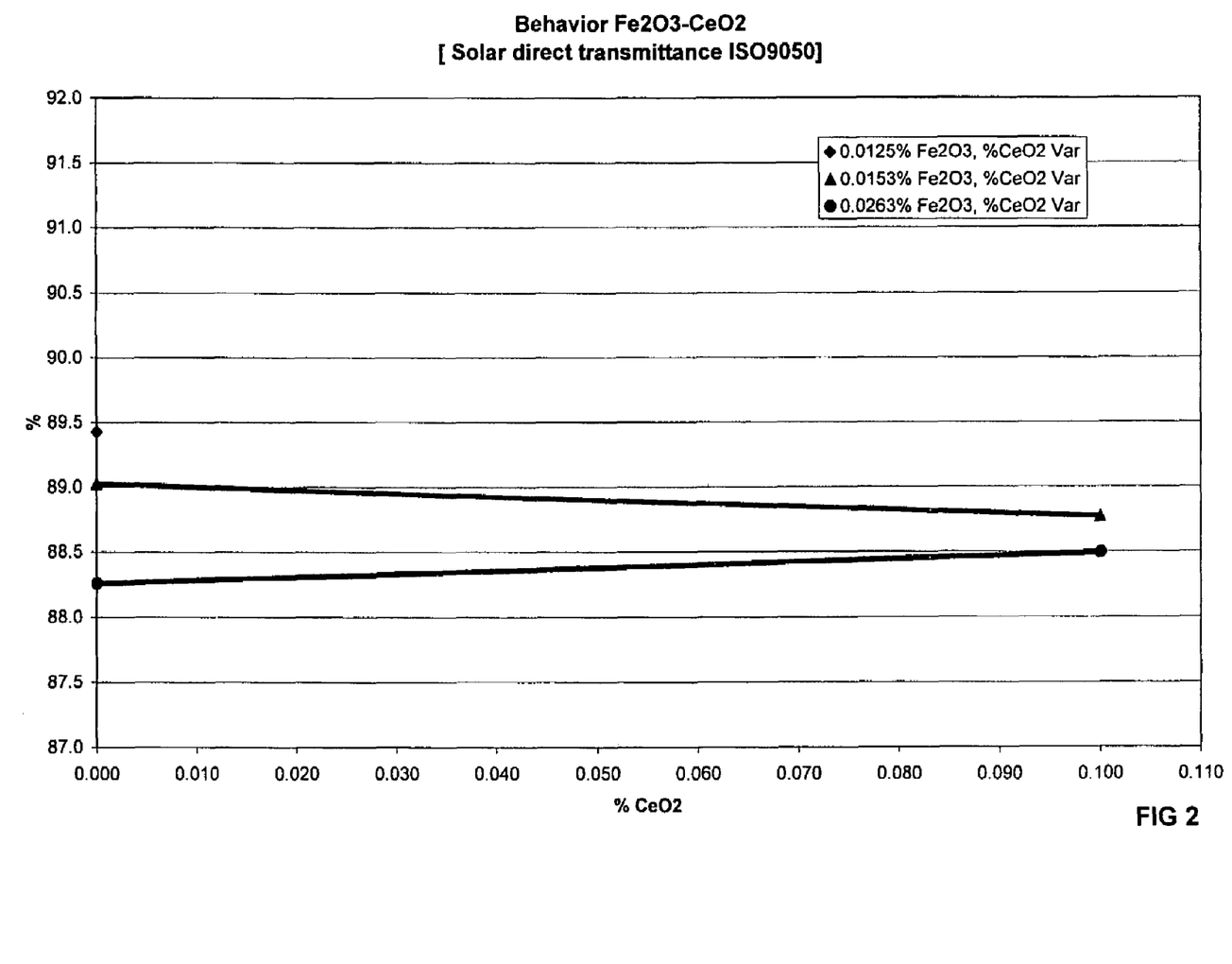
Figure 3:
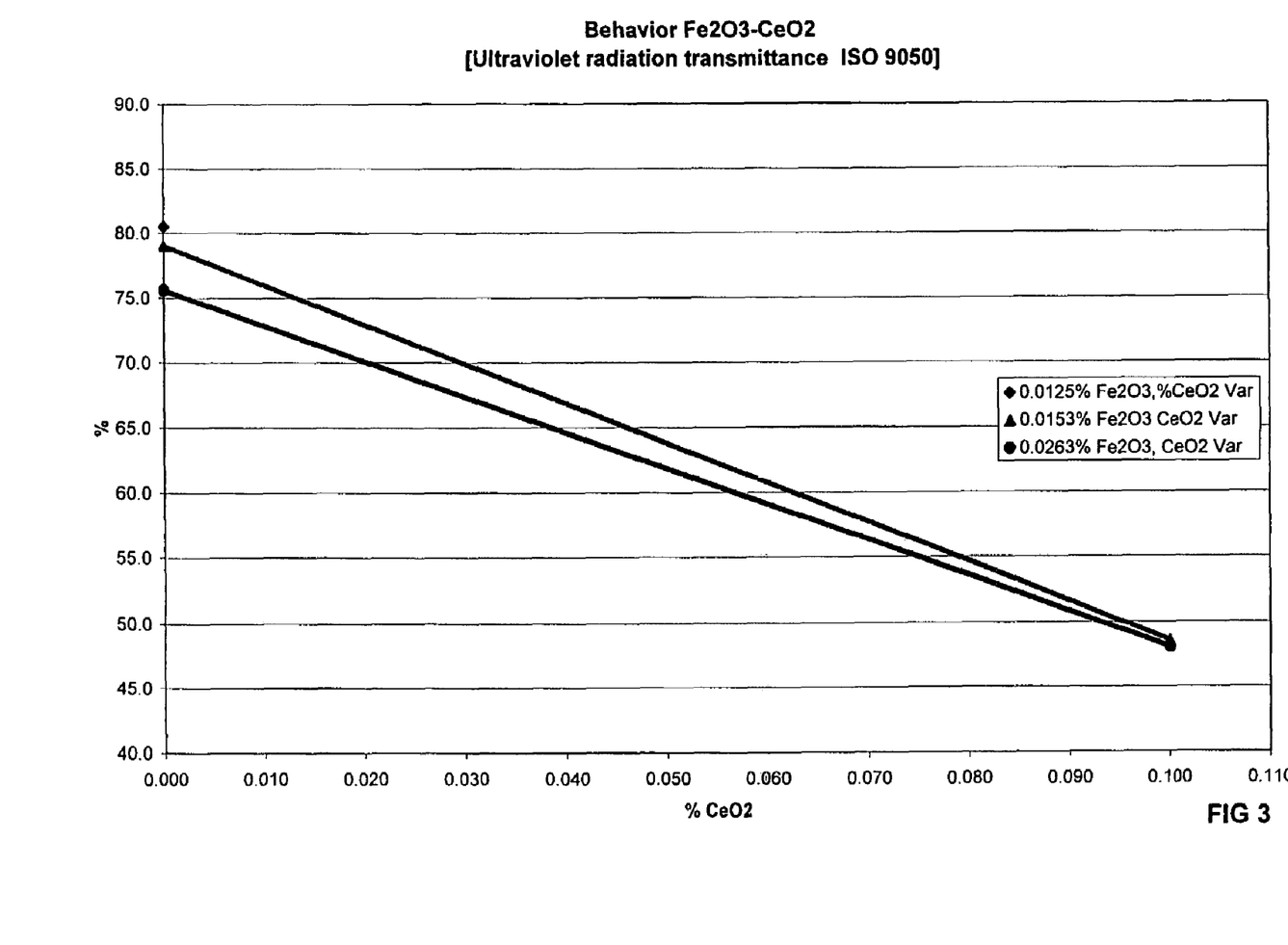

In accordance with the FIG. 3, laboratory tests shows the behavior of the UV transmission, when $CeO_2$ was added. In this graph the transmission of UV is diminishing notably. Also were observed changes in the levels of % ferrous (% FeO expressed as $Fe_2O_3/Fe_2O_3$ total) toward lower values, which confers to the glass a greater visibility, as well as, appearance of an absence of color.

Regarding to the behavior of $CeO_2$ and $TiO_2$ (FIG. 6), this results in a greater displacement of the UV absorption band toward a greater wavelength. This is not possible using independently the $TiO_2$ or $CeO_2$.

All the fusions were presented under same conditions of oxide-reduction in the batch and also in the furnace. Only the % wt of the components were modified.

Finally, when a light blue tone is required for finishing edges of a table top glass, small concentrations of cupric oxide (CuO) can be added to the glass composition of the present invention, in order to provide said light blue tone, without affecting the transparency of the glass. These concentrations are in the range from 0 to 0.01% wt.

From the above, a glass composition has been described and will apparent for the experts in the art that many other features or improvements can be made, which can be considered within the scope determined by the following claims.

We claim:

1. A glass composition with high visible light transmission and low ultraviolet light transmission having a base glass composition, comprising, in weight percentage: from 70 to 75% of $SiO_2$; from 10 to 15% of $Na_2O$; from 5 to 10% of CaO; from 0 to 5% of MgO; from 0.0 to 3% $K_2O$; from 0.1 to 1.0% $Al_2O_3$% and compounds consisting of from less than 0.03 wt % of ferric oxide, from 0.05 to 1 wt % of titanium oxide and from 0 to 0.6 wt % of cerium oxide, the glass having greater than 87% in visible luminous transmittance; a UV light transmission less than 60% and, a solar direct transmittance no more than 90%.

2. The glass composition as claimed in claim 1, wherein the glass has a visible luminous transmittance greater than 89%.

3. The glass composition as defined in claim 1, wherein said glass is produced with a thickness from about 3.2 millimeters.

4. The glass composition as defined in claim 1, wherein said composition comprises sands with about 0.010% of $Fe_2O_3$; dolomites with about 0.03% $Fe_2O_3$; and calcite with about 0.010% $Fe_2O_3$.

5. The glass composition as defined in claim 1, wherein said glass has a color tint as defined in the CIE Hunter Lab Iluminant C, in the ranges ah (green-red) from 0 to −0.5; bh (blue-yellow) from −0.5 to 1.0, and having an Lh value greater than 93.

6. The glass composition as defined in claim 1, wherein the glass composition further includes from 0 to 0.01% wt of CuO.

7. The glass composition as defined in claim 1, wherein the UV light transmission is less than 50%.

* * * * *